United States Patent [19]
Mol et al.
[11] 4,393,894
[45] Jul. 19, 1983

[54] FLUID SUPPLY AND DISPENSING APPARATUS

[75] Inventors: Hans C. Mol, Wilton; LeRoy H. Byrne, Waterbury, both of Conn.
[73] Assignee: Pitney Bowes Inc., Stamford, Conn.

[21] Appl. No.: 324,330
[22] Filed: Nov. 23, 1981
[51] Int. Cl.³ ............ G05D 9/00
[52] U.S. Cl. ............ 137/454; 118/401; 141/353
[58] Field of Search ............ 137/454, 322, 572, 386, 137/261; 222/405, 578, 580; 141/351, 352, 353, 363; 118/401

[56] References Cited

U.S. PATENT DOCUMENTS

| | | | |
|---|---|---|---|
| 3,402,747 | 9/1968 | Tissot-Dupont | 141/352 |
| 3,522,836 | 8/1970 | King | 118/401 |
| 3,623,503 | 11/1971 | Suzuki | 137/454 |
| 3,656,507 | 4/1972 | Martinez | 137/454 |
| 4,165,769 | 8/1979 | Hoffmann | 141/352 |

*Primary Examiner*—Martin P. Schwadron
*Assistant Examiner*—John A. Rivell
*Attorney, Agent, or Firm*—Donald P. Walker; Melvin J. Scholnick; Albert W. Scribner

[57] ABSTRACT

In a fluid supply and dispensing system including a fluid dispenser for carrying a working supply of fluid at working surface level, and a reservoir which is connected in fluid flow communication with the dispenser for carrying a replenishing supply of fluid at a surface level which establishes the working surface level of fluid in the dispenser, there is provided with an improvement for lowering the working surface level to prevent spillage of fluid from the dispenser when the system is not in use. The improvement includes providing the reservoir with a movable, fluid displacement member, which is normally lowered into the replenishing supply of fluid, and providing means for raising the displacement member at least partially out of the replenishing supply of fluid, when the system is not in use, for lowering the surface level of the replenishing fluid supply and thus the working surface level of the dispenser's working fluid supply.

8 Claims, 2 Drawing Figures

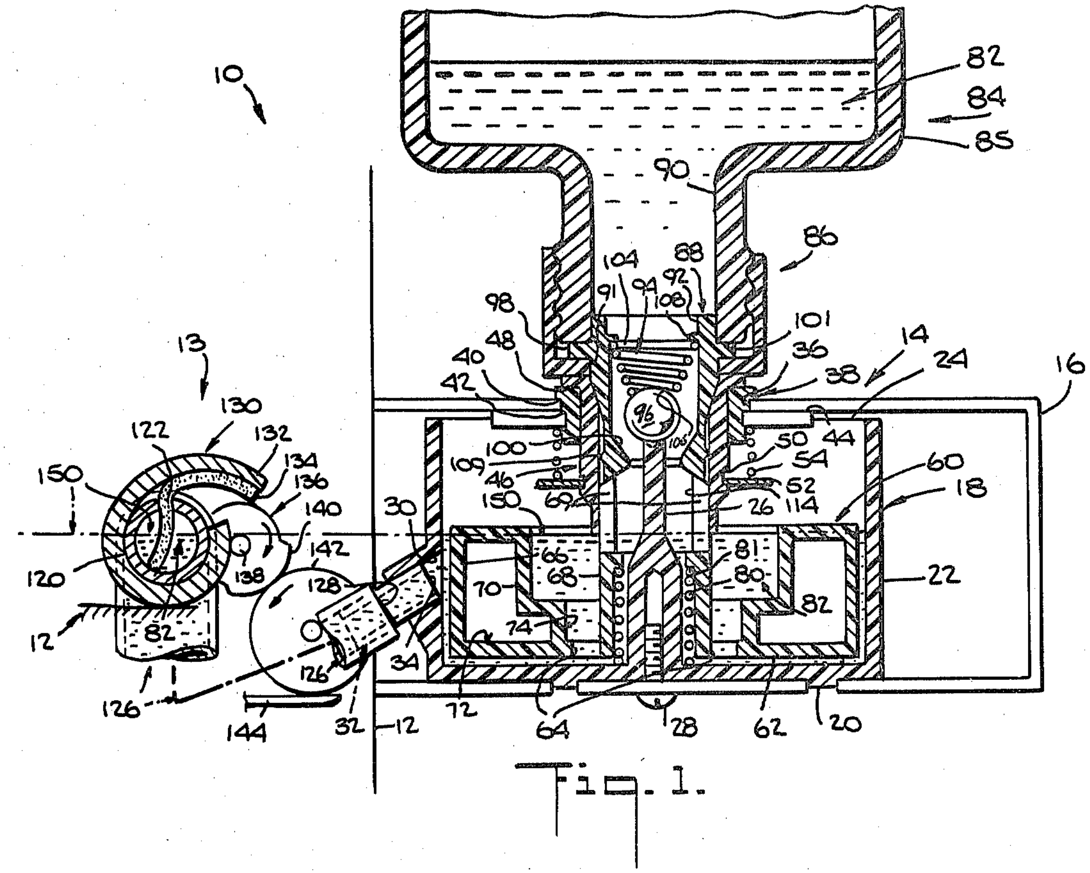
Fig. 1.
Fig. 2.
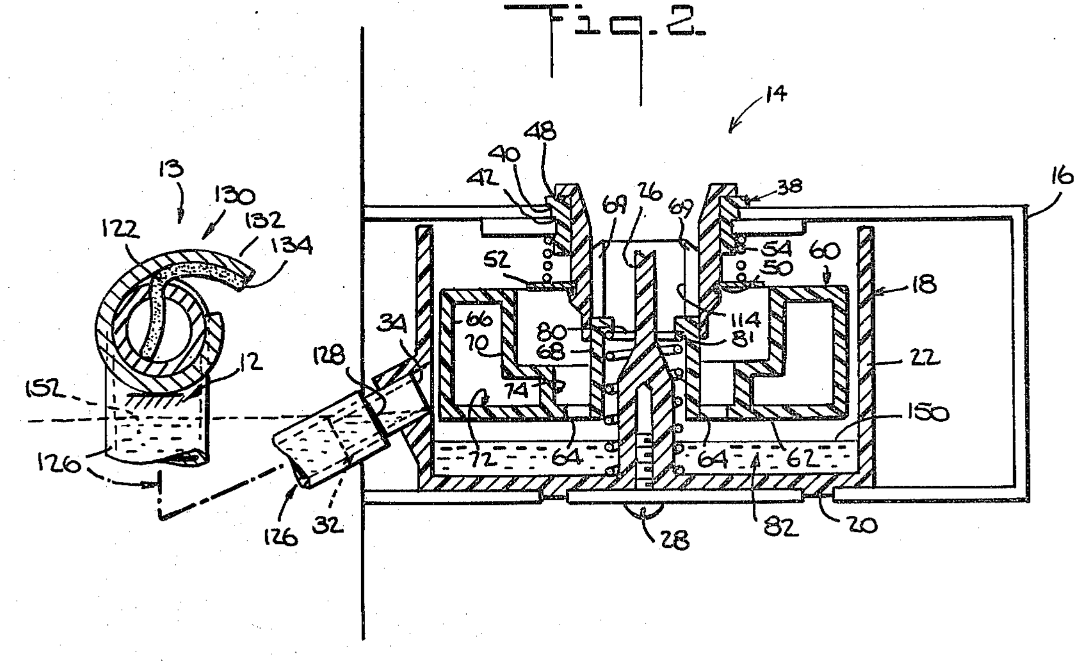

FLUID SUPPLY AND DISPENSING APPARATUS

BACKGROUND OF THE INVENTION

Commercially available spirit duplicating machines of the type which utilize address cards for imprinting addresses on mailpieces such as envelopes or postcards, generally utilize reusable address cards which have the mirror image of the mailing address imprinted on the card with a fluid soluble dye. The apparatus generally includes conventional means for feeding a mailpiece through a fluid dispensing station, where a fluid which is capable of at least partially dissolving the dye is applied to the appropriate surface of the mailpiece by means of a fluid applicator, then feeding the address card into overlying engagement with the wetted mailpiece surface such that the address imprintation on the card is disposed in intimate engagement with a wetted portion of the mailpiece's surface, then feeding the engaged mailpiece and card through a printing station where the mailpiece and address card are sufficiently forcefully pressed together to imprint the address on the mailpiece, and then feeding the mailpiece and card to a separating station where they are separated from each other.

Such spirit duplicating machines generally utilize highly volatile, relatively costly, fluids, such as alcohol, for partially dissolving the dye on the address cards. Accordingly, the fluid applicator must be generously and continuously wetted in the course of operation of the machine to offset losses due to vaporization from the applicator and from wetted mailpiece surfaces. To avoid unnecessary and costly losses of fluid, and accompanying fire and health hazards, due to spillage and vaporization, the fluid dispenser and associated fluid supply apparatus are sealed from the atmosphere to the extent it is possible to do so consistent with meeting operational requirements. Since it is an operational requirement to dispense copious amounts of fluid from the fluid dispenser, the working level of fluid in the dispenser is as a practical matter normally maintained at a working level such that the fluid is easily spillable from the dispenser if the machine is tipped. Spillages from dispensers of portable machines are therefore particularly difficult to avoid due to their inevitably being tipped to at least some extent in the course of being moved from one location to another. For such machines there has been a long felt need for a simple, cost effective solution to the spillage problem. Accordingly:

An object of the invention is to provide an improved fluid supply and dispensing system;

Another object is to provide a fluid supply and dispensing system constructed and arranged for reducing the likelihood of fluid spillages therefrom, and in particular from the system's fluid dispenser; and A further object is to provide an improved fluid supply reservoir, including fluid displacement means for reducing the level of fluid in the reservoir and communicating fluid dispenser.

SUMMARY OF THE INVENTION

In a fluid supply and dispensing system including fluid dispensing means for carrying a working supply of fluid having a working surface level, and including reservoir means, connected in fluid flow communication with the dispensing means, for carrying a replenishing supply of fluid having a surface level which establishes the working surface level of the working supply of fluid. There is provided, an improvement for lowering the working surface level to a non-working level. The improvement includes modifying the reservoir means to include a movable fluid displacement member which is normally lowered into the replenishing supply of fluid and to include means for raising the displacement member at least partially out of the replenishing supply of fluid, whereby the surface level of the replenishing supply of fluid and thus the working surface level is lowered to a non-working level.

BRIEF DESCRIPTION OF THE DRAWINGS

As shown in the drawings, wherein like reference numerals designate like or corresponding parts throughout the several views:

FIG. 1 is a partially fragmentary, vertical, cross-sectional, view of a replenishing fluid supply reservoir according to the invention, shown in fluid flow communication with a fluid dispenser and a removably mounted auxilliary fluid supply source.

FIG. 2 is a view of FIG. 1 showing the auxilliary fluid supply source removed from the reservoir.

DESCRIPTION OF THE PREFERRED EMBODIMENTS

A conventional spirit duplicator machine 10, of the type which may be modified according to the invention, generally includes framework 12 for supporting the various components of the machine 10 including a working fluid supply dispenser 13 and a replenishing fluid supply reservoir 14. The reservoir 14 includes a housing 16 which is conventionally removably attached to the framework 12 of the machine 10. The reservoir 14 additionally includes a receptacle 18 having a circularly-shaped base 20, and an upright, cylindrically-shaped, side wall 22 which forms the open upper end 24 of the receptacle 18. The receptacle 18 includes an upright, axially-extending post 26 which is integrally formed with the receptacle base 20. The lower half of the post 26 is internally threaded for receiving a screw 28 for fastening the receptacle 18 to the housing 16. The receptacle 18 additionally includes an aperture 30 which is formed in the receptacle's side wall 22 for receiving an open-ended, cylindrically-shaped, sleeve 32, having its end 34 disposed in fluid flow communication with the receptacle 18. The reservoir housing 16 has formed therein a circularly-shaped opening 36 which is located above the receptacle's open upper end 24. And, the reservoir 14 includes an annularly-shaped, plastic, flange 38, which is dimensioned to be mounted within, and in coaxial alignment with, the opening 36. The flange 38 includes a circularly-shaped upper lip portion 40, which overhangs, and is disposed in abutting engagement with, the upper surface of the housing 16. In addition, the flange 38 has formed therein a circularly-shaped, exterior, channel 42. For holding the flange in abutting engagement with the housing 16, the reservoir 14 includes a circularly-shaped retaining clip 44. The clip 44, which is mounted coaxially with the flange 38, and has its interior marginal edge nested within flange's channel 42 and its upper surface disposed in engagement with the interior surface of the housing 16. In addition, the reservoir 14 includes a generally cylindrically-shaped, plastic sleeve 46, which is dimensioned to be coaxially mounted with the flange 38 and in sliding and sealing engagement with the interior wall surface of the flange 38. The sleeve 46 includes an upper, circularly-shaped lip 48, which overhangs the upper end of the flange 38. The lower end of the sleeve 46 has formed therein a circularly-shaped, exterior, channel 50. A circularly-shaped washer 52, having its inner marginal edge nested within the channel 50, supports a compression spring 54, which is mounted in surrounding relationship with respect to the sleeve 46 and has its lower and upper ends respectively disposed in engagement with the washer 52 and retainer clip 44. With this arrangement, the sleeve lip 48 is normally held in sealing engagement with the upper end of the flange 38, due to the spring 54 normally urging the sleeve 46 downwardly. On the other hand, the sleeve 46 is slidably movable upwardly within the flange 38 against the force exerted on the sleeve 46 by the spring 54.

According to the invention the reservoir 14 additionally includes an annularly-shaped fluid displacement member 60. The displacement member 60 includes an annularly-shaped base wall 62, which has formed therethrough a plurality of apertures 64. The displacement member 60 also has upright, cylindrically-shaped, outer and inner walls, 66 and 68, which are each integrally formed with the base wall 62. The inner wall 68 extends upwardly and has formed therein a pair of oppositely spaced, longitudinally-extending openings 69. Between the outer and inner walls, 66 and 68, there is provided an intermediate wall 70 which is integrally formed with both the base and outer walls, 62 and 66, and divides the displacement member 60 into an annularly-shaped, hollow, air tank portion 72 and an annularly-shaped, hollow, fluid space portion 74; the latter being in fluid flow communication with the interior of the receptacle 18 via the apertures 64. The displacement member 60 is mounted in the receptacle 18, coaxial with, and in surrounding but spaced-apart relationship with respect to the receptacle's post 26. The upper end of the displacement member's inner wall 68 is dimensioned for disposition within, and in sliding engagement with the interior surface of the sleeve 46. The reservoir 14 also includes a spring 80 which is coaxially mounted with the post 26. The spring 80 is located within in the displacement member's inner wall 68 and in surrounding relationship with respect to the lower half of the post 26. The lower end of the spring 80 is seated against the inner surface of the receptacle's base wall 20, and the upper end is seated against a circularly-shaped, inwardly-protruding, ledge portion 81 of the inner wall 68. As shown in FIG. 2, the spring 80 is fully expanded, and the displacement member 60 is disposed in its raised position within the receptacle 18. On the other hand, as shown in FIG. 1, the displacement member 60 has been moved to its normally lowered position within the receptacle 18, against the force exerted on the receptacle 18 by the compressed spring 80.

For filling the reservoir 14, and more particularly the receptacle 18, with spirit duplicating fluid 82, the machine 10 includes an auxilliary source of fluid supply 84. The auxilliary supply 84 includes a bottle 85, which is provided with a removably mounted cap 86. In addition, the auxilliary supply 84 includes a removably attached ball check valve 88. The neck 90 of the bottle 85 and the cap 86 are respectively externally and internally threaded for removably attaching the cap 86 in sealing engagement with the bottle 85. The cap 86 has a circularly-shaped opening 91 formed therein. The ball check valve 88 includes a generally-cylindrically-shaped valve body 92, a spring 94 and ball 96. As viewed in FIG. 1, the valve body 92 includes a circularly-shaped, radially outwardly-extending, lip portion 98 near its upper end, and a circularly-shaped, radially inwardly-extending ball seat portion 100, near its lower end. The upper end of the valve body 92 is dimensioned for insertion into the opening of the neck 90 of the bottle 85, for seating the valve body's lip portion 98 against the inverted top end edge 101 of the bottle 85. In addition, the valve body 92 and cap 86 are respectively dimensioned to permit insertion of the lower end of the valve body 92 through the cap opening 91 for seating the valve body's lip portion 98 against the inner surface of the cap 86. With this arrangement the valve 88 is held in place on the bottle 84 by compressing the valve body's lip portion 98 between the cap 86 and the inverted top end edge 101 of the bottle 85. The spring 94 is preferably a conically-shaped, helically coiled, compression spring, having a base end 104 and a ball engaging end 106. The spring 94 is mounted in place within the valve body 92 by means of a conventional, annularly-shaped, spring clip 108, which fixedly engages the valve body 92 and is movably engaged by the spring's base end 104. And the ball 96 is disposed within the valve body 92 between the spring's end 106 and the valve body's seat portion 100. Preferably the valve body 92 additionally includes a cylindrically-shaped, radially-outwardly-extending, protrusion 109, adjacent to the valve seat end of the valve body 92, for providing an air-tight seal between the valve body 92 and sleeve 46.

For mounting the auxilliary source of supply 84 of fluid 82 on the reservoir 14, the valve body 92 is inserted into the reservoir's sleeve 46. As the bottle 85 is lowered, the valve body's protrusion 109 slidably engages the interior surface of the reservoir's sleeve 46. When the ball 96 engages the post 26 the ball's downward motion is halted. Thereafter, the spring 94 is compressed as the valve seat 100 is lowered below the level of the ball 96. When this occurs, fluid 82 from the bottle 85 flows into the receptacle 18, via the displacement member's openings 69, until the atmospheric pressure on the surface of the fluid 82 within the receptable 18 and dispenser 13 and the lifting force exerted by the vacuum within the bottle 85, balance the weight of the column of fluid 82 within the bottle 85. The level of the fluid 82 within the receptacle 18 is established by the lower end of the reservoir sleeve 46, due to the sleeve 46 acting as an extension of the valve body 92 since the protrusion 109 is disposed in sealing engagement with the sleeve 46. Concurrently, as the valve body 92 is inserted into the reservoir 18, the lowermost end of the valve body 92 engages the upper end of the displacement member's inner wall 68, and lowers the displacement member 60 against the force exerted on the ledge 81 by the spring 80. As a result, the displacement member 60 is lowered into the incoming fluid 82. Of course, since fluid 82 is displaced by the member 60, less fluid flows from the bottle 85 than would otherwise be needed in order to raise the level of fluid 82 within the receptacle 18 to the lower end edge of the sleeve 46.

The working fluid supply dispenser 13, includes a receptacle 120, such as a cylindrically-shaped member having formed therein a longitudinally-extending opening 122. The receptacle 120, which has one closed end, has an open end to which there is conventionally fixedly attached one of the ends of the elongate tube 126. The other end 128 of the tube 126 is conventionally fixedly attached to the sleeve 32, for connecting the reservoir 14 and dispenser 13 in fluid flow communication with each other. The dispenser's receptacle 120 is removably attached to the machine's framework 12 by means of an elongate clamp 130 which has a laterally-extending portion 132. The dispenser 13 additionally includes an elongate working fluid withdrawal member 134, such as fibrous pad, which extends into the receptacle's opening 122 and overhangs the outer periphery of the receptacle 120, for engagement by a cam 136. The cam 136, which is conventionally mounted for rotation on a driven shaft 138, has a lobe 140 which is rotated into engagement with the pad 134. Whereupon the pad 134 is pressed against the clamp's overhanging portion 132, with the result that the cam lobe 140 is copiously wetted with working fluid 82. A workpiece wetting applicator roller 142 is mounted for engagement by the cam lobe 140, for transferring fluid 82 to the roller 142 which, in turn, transfers fluid to a workpiece 144, such as an envelope or post card, fed by well-known means into engagement with the roller 142.

As shown in FIG. 1, the working surface level 150 of fluid 82 in the dispenser 13 is established by the surface level 150 of the fluid 82 in the reservoir 14. More particularly, upon filling the reservoir 14 from the auxilliary source of fluid supply 84, the receptacle 18 is filled to the surface level 150 which is determined by the location of the lower end edge of the sleeve 46, the dispenser 13 is correspondingly filled. As fluid 82 is dispensed from the dispenser's receptacle 120 by the pad 134, the pad 134, withdraws fluid 82 from the receptacle 120, by capilliary action, which is replenished from the reservoir 14 via the tube 126. When the surface level 150 of fluid 82 within the reservoir 14 is sufficiently lowered due to fluid 82 being dispensed from the dispenser 13, the vacuum in the bottle 85 is slightly broken due to the weight of the column of fluid 82 within the bottle 85 no longer being balanced. When this occurs air from the receptacle 18 enters the bottle 85 and fluid 82 flows from the bottle 85 until the surface level 150 of the fluid 82 within the receptacle 18, and thus within the dispenser 13 is reestablished.

When the machine 10 is shut down, the auxilliary supply 84 is ordinarily removed. Since the valve body protrusion 109 is disposed in sealing engagement with the sleeve 46, when an attempt is made to remove the the auxilliary supply 84 by upwardly raising the bottle 85, the protrusion 109 tends to raise the sleeve 46 against the force exerted on the sleeve 46 by the spring 54, thereby storing energy in the spring 54. When the combination of the removal force exerted on the bottle 85 and the energy stored in the spring 54 overcomes the force exerted on the sleeve 46 by the protrusion 109, the seal between the sleeve 46 and valve body 92 is rapidly broken, and the spring 54 slidably returns the sleeve 46 to the position shown in FIG. 1. Concurrently, as the bottle 85 is raised, the valve seat 100 engages the ball 96 which is thereupon held in place on the seat 100 by the valve spring 94. In addition, as the bottle 85 is raised, the displacement member 60 is raised upwardly within the receptacle 18 due to the force exerted on the displacement member 60 by the expanding spring 80; whereupon the the fluid 82 (FIG. 2) within reservoir 14 is no longer displaced by the displacement member 60. As a result, the fluid in the dispenser 13 drains into the tube 126. Preferably, the volume of fluid 82 (FIG. 1) displaced by the displacement member 60 is at least equal to the volume of working fluid 82 which is carried by the dispenser's receptacle 120. However, it is within the scope of the invention to drain, for example, at least one-fourth of the fluid 82 from the dispenser's receptacle 120, to significantly avoid spillage from the dispenser 13 when the machine 10 is tilted in the course of being relocated. As shown in FIG. 2, if the surface level of reservoir fluid 82 is lowered below the aperture 30 when the displacement member 60 is raised, the aperture 30, rather than the reservoir fluid 82, establishes the fluid level 152 in the section of the tube 126 adjacent to the dispenser's receptacle 120. Accordingly, the maximum volume of the displacement member 60 is preferably not more than the volume of reservoir fluid 60 which is displacable for lowering the reservoir fluid level such that the reservoir aperture 30 establishes the dispenser's surface level 152.

In accordance with the objects of the invention there has been described improved fluid supply and dispensing apparatus for use, for example, in a spirit duplicator. The improved apparatus includes fluid level displacement structure for preventing spillage and accompanying vaporization of the fluid.

Inasmuch as certain changes may be made in the above described invention without departing from the spirit and scope of the same, it is intended that all matter contained the above description or shown in the accompanying drawings shall be interpreted in an illustrative rather than limiting sense. And, it is intended that the following claims be interpreted to cover all the generic and specific features of the invention herein described.

What is claimed is:

1. In a fluid supply and dispensing system including fluid dispensing means for carrying a working supply of fluid having a working surface level, and including reservoir means connected in fluid flow communication with said dispensing means for carrying a replenishing supply of fluid having a surface level which establishes the working surface level of the working supply of fluid, an improvement for lowering the working surface level to a non-working level, said improvement comprising:

a. said reservoir means including a movable fluid displacement member which is normally lowered into the replenishing supply of fluid; and b. means for raising the displacement member at least partially out of the replenishing supply of fluid, whereby the surface level of the replenishing supply of fluid and thus the working supply surface level is lowered to a non-working level.

2. The improvement according to claim 1, wherein said means for raising the displacement member includes spring means mounted in said reservoir means for urging the displacement member upwardly within said reservoir means.

3. The improvement according to claim 1, wherein the dispensing means includes a receptacle for carrying the working supply of fluid, and said displacement member having a volume which is at least one-fourth of the volume of the working supply of fluid within the receptacle.

4. The improvement according to claim 1, wherein the reservoir means includes an opening thereinto, said reservoir means includes sleeve means mounted in said opening, said sleeve means including a sleeve member having a cylindrically-shaped inner surface, and said displacement member dimensioned for slidable engagement with the inner surface of said sleeve member.

5. The improvement according to claim 4, wherein said displacement member includes a cylindrically-shaped wall disposed in sliding engagement with said sleeve member, and said displacement member wall having at least one opening formed therein for fluid flow communication therethrough.

6. The improvement according to claim 2, wherein said displacement member includes a ledge, and said spring means including a spring disposed in engagement with said ledge for normally urging said displacement member upwardly within said reservoir means.

7. The improvement according to claim 6, wherein said reservoir means has an opening thereinto, said reservoir means including a sleeve mounted within said opening, said displacement member includes a wall disposed in sliding engagement with said sleeve, and said wall having an opening formed therein for fluid flow communication therethrough.

8. A fluid supply and dispensing means for use in combination with an auxilliary supply of fluid, comprising:

a. means for dispensing fluid, said dispensing means including means for carrying a working supply of fluid at a working surface level;

b. means for replenishing said working supply of fluid, said replenishing means connected in fluid flow communication with said dispensing means, said replenishing means including means for carrying a replenishing supply of fluid at a surface level establishing said working surface level, said replenishing means adapted to have removably mounted thereon said auxilliary supply of fluid; and c. said replenishing means including a fluid displacement member, said replenishing means including spring means for normally urging said fluid displacement member upwardly, said fluid displacement member adapted to be urged downwardly against the urging of said spring means by said auxilliary fluid supply means when said auxilliary fluid supply means is mounted on said replenishing means, the lowered fluid displacement member being immersed in said replenishing fluid supply when said auxilliary fluid supply is mounted on said replenishing means, said surface level of said replenishing fluid supply and thus said working surface level of said working fluid supply being established when said fluid displacement member is immersed in said replenishing fluid supply, and said spring means urging said displacement member at least partially out of said replenishing fluid supply when said auxilliary fluid supply is removed from said replenishing means, whereby the fluid surface level of said replenishing fluid supply and thus the working surface level of said working fluid supply is lowered.

* * * * *